US012595672B2

(12) United States Patent
    Allison

(10) Patent No.: US 12,595,672 B2
(45) Date of Patent: Apr. 7, 2026

(54) POOL SKIMMER DEVICE

(71) Applicant: David Allison, Clifton, TX (US)

(72) Inventor: David Allison, Clifton, TX (US)

( * ) Notice: Subject to any disclaimer, the term of this patent is extended or adjusted under 35 U.S.C. 154(b) by 417 days.

(21) Appl. No.: 18/320,231

(22) Filed: May 19, 2023

(65) Prior Publication Data

US 2024/0175279 A1 May 30, 2024

Related U.S. Application Data

(60) Provisional application No. 63/428,432, filed on Nov. 29, 2022.

(51) Int. Cl.
    *E04H 4/12* (2006.01)
    *E04H 4/16* (2006.01)
    *C02F 103/42* (2006.01)

(52) U.S. Cl.
    CPC ......... *E04H 4/1254* (2013.01); *E04H 4/1609* (2013.01); *C02F 2103/42* (2013.01)

(58) Field of Classification Search
    CPC ... E04H 4/1254; E04H 4/1609; E04H 4/1272; C02F 2103/42
    USPC .. 210/167.18, 167.19, 167.2, 238, 470, 471, 210/167, 2; 4/490, 496
    See application file for complete search history.

(56) References Cited

U.S. PATENT DOCUMENTS

| | | | |
|---|---|---|---|
| 3,625,364 A | 12/1971 | La Chance | |
| 3,863,237 A | * 1/1975 | Doerr ..................... | A01K 63/10 |
| | | | 299/8 |
| 4,369,109 A | 1/1983 | Edge | |
| 4,822,487 A | * 4/1989 | Soich ..................... | E04H 4/1609 |
| | | | 210/241 |
| 5,043,060 A | * 8/1991 | Brennan ............... | E04H 4/1609 |
| | | | 210/167.2 |
| 5,350,508 A | * 9/1994 | Van der Watt ........ | E04H 4/1263 |
| | | | 210/167.2 |
| 5,705,058 A | * 1/1998 | Fischer ................. | E04H 4/1263 |
| | | | 210/242.1 |
| 5,911,878 A | * 6/1999 | Benvenuto ............ | E04H 4/1263 |
| | | | 210/488 |
| 7,909,991 B2 | 3/2011 | Hernandez | |
| 2004/0108259 A1 | 6/2004 | Giannantonio | |
| 2009/0188851 A1 | 7/2009 | DePinto | |
| 2013/0256203 A1 | 10/2013 | Schultz | |
| 2016/0024810 A1 | * 1/2016 | Bair ..................... | E04H 4/1609 |
| | | | 210/242.1 |

* cited by examiner

*Primary Examiner* — Fred Prince

(74) *Attorney, Agent, or Firm* — Brennan, Manna & Diamond, LLC

(57) ABSTRACT

A pool skimmer is disclosed that comprises a base component comprised of a bar with a U-shaped net component secured to it. The net component measures two to three feet wide and is comprised of fine, stainless-steel microns. A flexible, telescopic handle is then secured to the base component. The base component is placed inside of the swimming pool and comprises a flotation system to allow the device to be positioned halfway above the water level. The U-shaped net allows a user to capture small bugs, leaves, or other unwanted debris within the swimming pool quickly and efficiently.

12 Claims, 4 Drawing Sheets

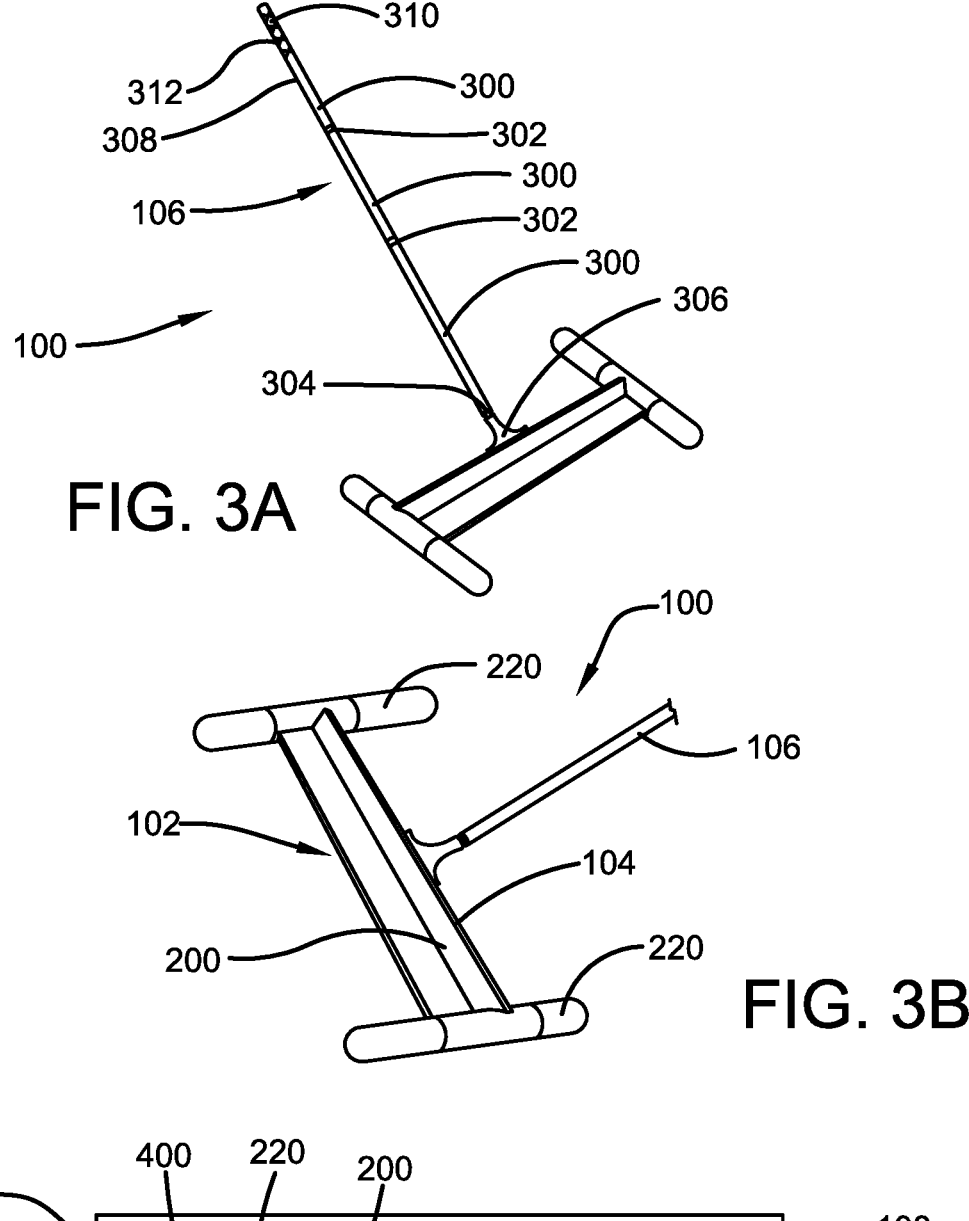
FIG. 3A
FIG. 3B
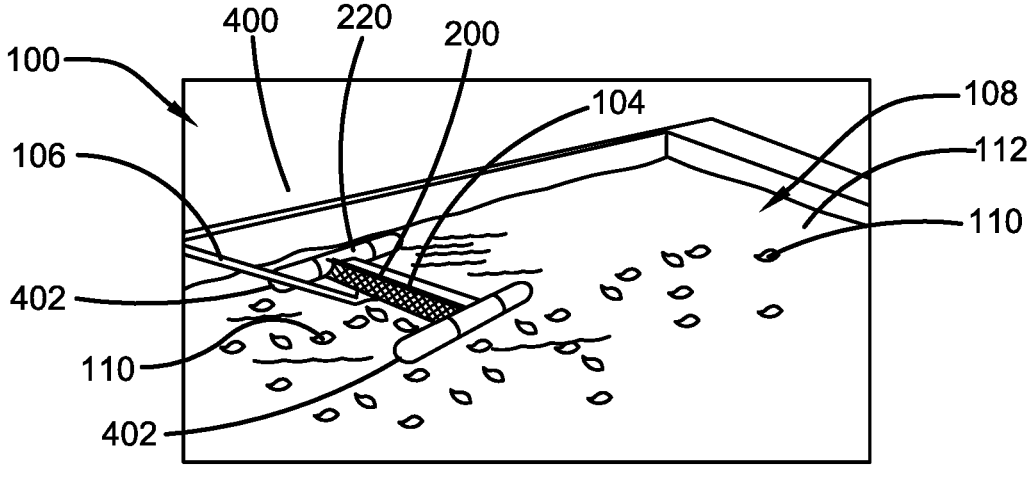
FIG. 4

Providing a pool skimmer device comprising a base component with a 2-3 foot wide net component and a telescoping handle — 600

Extending the telescoping handle to a desired height — 602

Positioning the pool skimmer device in a pool such that a pair of long pontoons keep the device afloat — 604

Pulling the device along the pool surface to skim the pool of debris — 606

POOL SKIMMER DEVICE

CROSS-REFERENCE TO RELATED APPLICATION

The present application claims priority to, and the benefit of, U.S. Provisional Application No. 63/428,432, which was filed on Nov. 29, 2022, and is incorporated herein by reference in its entirety.

FIELD OF THE INVENTION

The present invention relates generally to the field of pool skimmer devices. More specifically, the present invention relates to a modified pool skimmer featuring a two- to three-foot wide head end to better catch debris on the pool surface. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in pool skimmer devices. Generally, people who own pools are required to also own a skimmer to remove debris from the water surface. Standard pool skimmers have a small tool head, similar in size to a shovel. These skimmers need to be run through the water several times to remove all debris, taking considerable time and effort.

Furthermore, many swimming pools accumulate unwanted debris, such as leaves, pollen, seeds, insects, etc., on the surface of the water. Commonly, existing circulation and filtration systems may be ineffective at removing this debris from the water's surface. Accordingly, pool owners frequently and undesirably are required to manually capture and remove debris from the water's surface using a small pool skimmer net.

Accordingly, a need remains for a pool skimmer that reduces the time needed to skim the water surface of a pool. Further, a pool skimmer with an enlarged head end is necessary to catch debris quicker and more efficiently, allowing users to pick up pool debris with ease.

Therefore, there exists a long-felt need in the art for a pool skimmer device that provides users with a modified pool skimmer featuring a two to three foot wide head end to better catch debris on the pool surface. There is also a long-felt need in the art for a pool skimmer device that allows users to pull the wide net head end through the water to capture leaves, twigs, insects, and various other debris with ease. Further, there is a long-felt need in the art for a pool skimmer device that includes a pivoting mechanism to adjust the angle of the tool head, along with a telescopic handle to extend or retract its length. Moreover, there is a long-felt need in the art for a device that reduces the time it takes to clean and skim the water surface of a pool. Further, there is a long-felt need in the art for a pool skimmer device that comprises a bar with a net measuring two to three feet wide attached to a flexible handle. Finally, there is a long-felt need in the art for a pool skimmer device that utilizes a stainless steel, U-shaped net.

The subject matter disclosed and claimed herein, in one embodiment thereof, comprises a pool skimmer device. The device is a pool skimmer for capturing floating scum inside of a swimming pool. The pool skimmer device comprises a base component comprised of a bar with a net component secured to it. Typically, the net component is cast into the base component to form a U-shaped component. The net component measures two to three feet wide and is comprised of fine, stainless-steel microns. A flexible handle is then secured to the base component. The handle is telescopic and has the ability to connect to the base component, like a push broom. The handle utilizes metal supports that range from the base component to the handle of the device. The base component is placed inside of the swimming pool and comprises a flotation system to allow the device to be positioned halfway above the water level. Generally, the flotation system comprises a pair of small, yet long pontoons. The U-shaped net allows a user to capture small bugs, leaves, or other unwanted debris within the swimming pool.

In this manner, the pool skimmer device of the present invention accomplishes all of the foregoing objectives and provides users with a device that allows users to skim a pool surface with ease. The device is a pool skimmer with a two to three foot wide head end. The base component of the device can be manufactured of plastic and the net component manufactured of stainless steel.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pool skimmer device. The device is a pool skimmer for capturing floating scum inside of a swimming pool. The pool skimmer device comprises a base component comprised of a frame with a net component secured to it. Typically, the net component measures two to three feet wide. A flexible handle is then secured to the base component. The handle can swivel and is telescopic and has the ability to connect to the base component, like a push broom. The base component is placed inside of the swimming pool and comprises a pair of floating pontoons to allow the device to float. Thus, the large net component allows a user to capture small bugs, leaves, or other unwanted debris within the swimming pool.

The disclosed pool skimmer device relates to a device that is configured to clean a pool, such as a swimming pool. The device may be configured, in particular, to clean debris, such as pollen, insects, seeds, leaves, etc., from the surface of the water in a pool.

In one embodiment, the pool skimmer device comprises a base component which is shown as generally having a frame which is generally rectangular in shape and a net component which is attached to the frame and is in the nature of an open weave netting or mesh similar to that used in more conventional pool skimmers. Thus, it will be understood by those skilled in the art that the net component is a porous material which allows water to move easily therethrough and is configured to prevent the passage of most debris.

In one embodiment, the frame comprises a lower frame member and an upper frame member and front and back, as well as right and left opposing side walls. The frame is generally rectangular in shape, but can be any suitable shape as is known in the art. Further, the frame is generally two to three feet long (i.e., the same length as the net component's width), but can be any suitable shape and size as is known in the art. The frame components may comprise aluminum or plastic tubing or rods, etc., which may be formed of an injection-molded or vacuum-formed plastic.

In one embodiment, the edges of the net component are integrally bonded to the frame members through a molding or other thermally activated process. Typically, the net component is secured to the base component to form a U-shaped component but can be secured via any suitable shape and position as is known in the art. In one embodiment, the net component forms a receiving U-shaped receptacle, with an open end secured to the upper and lower frame members, thus forming a constant, rigid passageway into said net component. Generally, the net component measures two to three feet wide but can be any suitable size as is known the art. Further, the net component is typically comprised of a fine, stainless-steel mesh that measures between one to five microns. However, an open-weave netting, nylon screen, or a micromesh bag can also be used, or any other suitable porous material which allows water to move easily therethrough and is configured to prevent the passage of most debris.

In one embodiment, a set of long floating pontoons are secured at respective ends of the frame, one at each end. The floating pontoons can be any suitable shape and size as is known in the art. Typically, the floating pontoons are shaped as cylinders and secured as the net component is, via molding or other thermally activated process as is known in the art. The floating pontoons are typically lightweight foams, such as polystyrene foam or the like. It is important that the floating pontoons have sufficient buoyancy to prevent the base component from sinking too far below the water level. Typically, the floating pontoons are sized and shaped to allow the device to be positioned halfway above the water level. Generally, the device need only be of sufficient buoyancy to float on the surface of the water in the pool. In this manner, water, with its entrained debris, flows by virtue of the circulation currents in the pool in the direction of the device, wherein the debris is collected by the net component.

In one embodiment, the pool skimmer device is an H-shaped floating arrangement with a net component secured to the base component and having one of the pair of floating pontoons secured to either side of the base component. By providing a pair of floating pontoons, one at each end of the base component, the device is rendered more symmetrical, and this construction may simplify manufacture.

In one embodiment, a flexible handle is then secured to the base component. The handle is telescopic and has the ability to connect to the base component. The handle utilizes metal supports or segments that range from the base component to the handle of the device to telescope the handle. Specifically, the handle comprises at least one telescoping segment that allows the total length of the handle to be extended or retracted. Each telescoping segment is hollow and has a slip lock for locking the segment at a specific length. Further, the slip lock is released by means of pressing or turning the slip lock. The at least one telescoping segment allows the handle to have a length from approximately three feet to six feet fully extended, allowing a user to set the pool skimmer device at a desired height. Thus, the device is approximately three feet in length but can be adjusted to a length of approximately six feet, if needed. Any type of telescoping lock, such as a clutch lock, cam lock, spring button, snap lock, set knob, or any other suitable lock as is known in the art, can be used for securing a desired length of the telescoping segments and for securing the telescoping segments to each other, during extension and retraction of the telescoping segments of the handle. Furthermore, a slip lock is typically also used to secure the handle end to the base component, similar to a push broom. However, any other suitable securing means can be utilized as is known in the art.

In one embodiment, the handle can swivel. Thus, the handle is secured to the base component via a ball and socket hinge, swivel hinge, etc., or any other suitable swiveling means as is known in the art.

In one embodiment, the handle comprises a first end secured to the base component and a second end configured to be held by a user. The second end comprises an ergonomic hand area that comprises texture or gripping sections to allow the user to securely retain the handle in their hands, even when it is wet.

In use, the user, holding the second end of the handle while standing on the deck surrounding the pool, controls the movement of the base component while drawing the same through the water, and without affecting the depth of the opening of the net component. The respective ends of the floating pontoons are tapered upwardly to provide easy movement of the device in the water and to allow the base component to slip easily over the objects encountered in the water, such as vacuum hoses, and the like, without interfering with the skimming operation. Further, the frame members maintain the frame in alignment with the floating pontoons to maintain the device at the predetermined depth in the water.

In use, the pool skimmer device is drawn through the water with the open end of the U-shaped net component partially submerged so that leaves, grass, and other debris may pass through said opening and into the net component. Further, the skimmer device readily and easily moves through the water, so that it will be possible for a user, including women and children, to skim the pool with ease. Additionally, the large net area allows a user to draw the pool skimmer device over the entire area of the pool surface from the deck of the pool, efficiently and quickly.

The above description relates mostly to the use of the pool skimmer device in swimming pools. However, the design of this device will allow it to be used in many different bodies of water for many different duties. These include, but are not limited to, fishponds to remove surface debris; water fountains; oceans to rid the ocean of unwanted contaminants, such as oil or small floating plastics; and/or industries to clean retaining ponds. However, in all of these cases, the size of the device may vary. For example, in a fish pond the device may only comprise a net component of two feet in width. In the ocean, the device may comprise a net component of three feet in width. The size of the device is determined by the task that it is to perform and the medium in which it is placed.

In yet another embodiment, the pool skimmer device comprises a plurality of indicia.

In yet another embodiment, a method of skimming a pool's surface easily and efficiently is disclosed. The method includes the steps of providing a pool skimmer device comprising a base component with a two to three feet wide net component and a telescopic handle. The method also comprises extending the telescopic handle to a desired height. Further, the method comprises positioning the pool skimmer device in a pool, such that a pair of long pontoons keep the device afloat. Finally, the method comprises pulling the device along the pool surface to skim the pool of debris.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIGS. 3A-B illustrate a perspective view of one embodiment of the pool skimmer device of the present invention showing how the handle can be adjusted in accordance with the disclosed architecture;

FIG. 4 illustrates a perspective view of one embodiment of the pool skimmer device of the present invention showing the skimmer device in use to collect leaves in accordance with the disclosed architecture;

DETAILED DESCRIPTION OF THE PRESENT INVENTION

Figure 1:
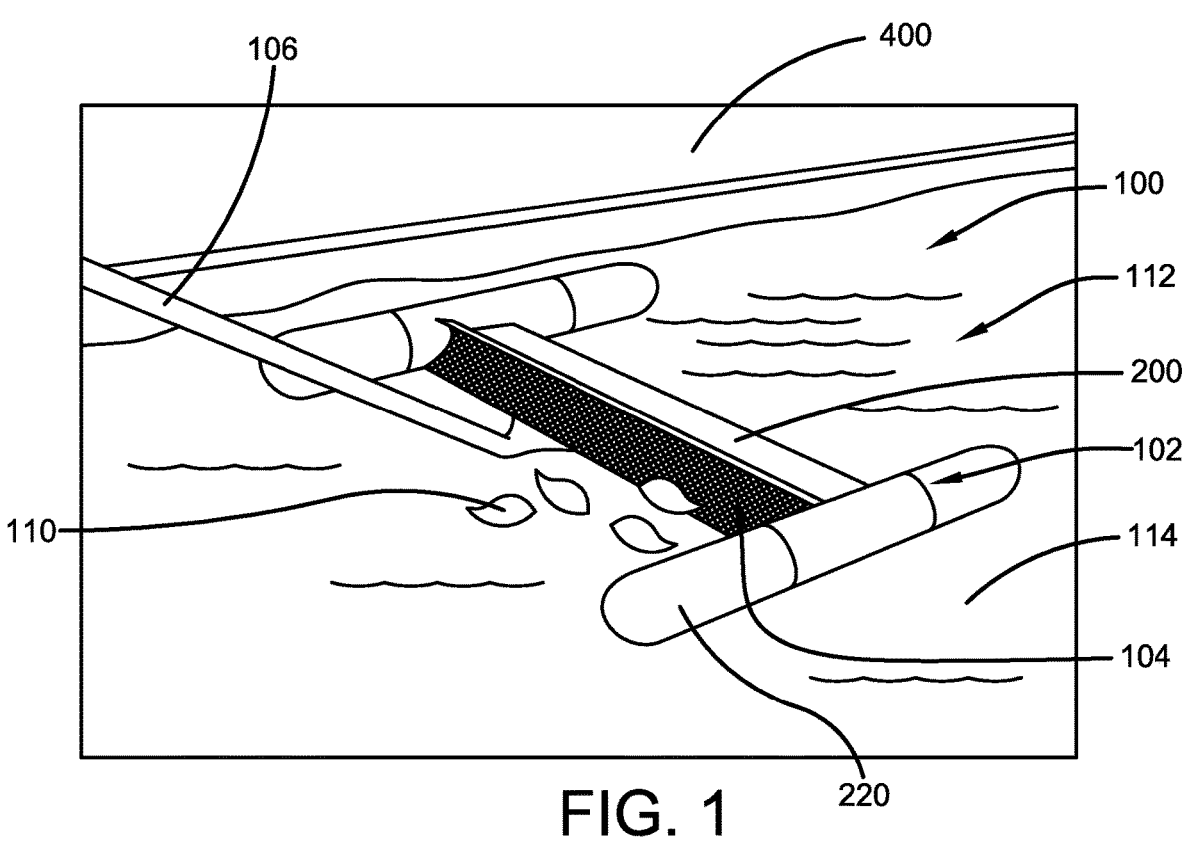
FIG. 1 illustrates a perspective view of one embodiment of pool skimmer device of the present invention showing the device used in a pool in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a pool skimmer device that provides users with a modified pool skimmer featuring a two to three foot wide head end to better catch debris on the pool surface. There is also a long-felt need in the art for a pool skimmer device that allows users to pull the wide net head end through the water to capture leaves, twigs, insects, and various other debris with ease. Further, there is a long-felt need in the art for a pool skimmer device that includes a pivoting mechanism to adjust the angle of the tool head, along with a telescopic handle to extend or retract its length. Moreover, there is a long-felt need in the art for a device that reduces the time it takes to clean and skim the water surface of a pool. Further, there is a long-felt need in the art for a pool skimmer device that comprises a bar with a net measuring two to three feet wide attached to a flexible handle. Finally, there is a long-felt need in the art for a pool skimmer device that utilizes a stainless steel, U-shaped net.

The present invention, in one exemplary embodiment, is a novel pool skimmer device. The pool skimmer device comprises a base component comprised of a bar with a net component secured to it. Typically, the net component is two to three feet wide and is a U-shaped component. A flexible telescopic handle is then secured to the base component. The base component is placed inside of the swimming pool and comprises a flotation system to allow the device to be positioned halfway above the water level. The U-shaped net allows a user to capture small bugs, leaves, or other unwanted debris within the swimming pool. The present invention also includes a novel method of skimming a pool's surface easily and efficiently. The method includes the steps of providing a pool skimmer device comprising a base component with a two to three feet wide net component and a telescopic handle. The method also comprises extending the telescopic handle to a desired height. Further, the method comprises positioning the pool skimmer device in a pool, such that the long pontoons keep the device afloat. Finally, the method comprises pulling the device along the pool surface to skim the pool of debris.

Referring initially to the drawings, FIG. 1 illustrates a perspective view of one embodiment of the pool skimmer device 100 of the present invention. In the present embodiment, the pool skimmer device 100 is an improved pool skimmer device 100 that allows a user to skim a pool 108 with ease. Specifically, the pool skimmer device 100 comprises a base component 102 with a two to three feet wide net component 104 and a handle 106. The base component 102 is placed inside of the swimming pool 108 and the large net component 104 allows a user to capture small bugs, leaves, or other unwanted debris 110 from within the swimming pool 108.

Generally, the disclosed pool skimmer device 100 relates to a device that is configured to clean a pool, such as a swimming pool 108. The device 100 may be configured, in particular, to clean debris 110, such as pollen, insects, seeds, leaves, etc., from the surface 114 of the water 112 in a pool 108.

Figure 2:
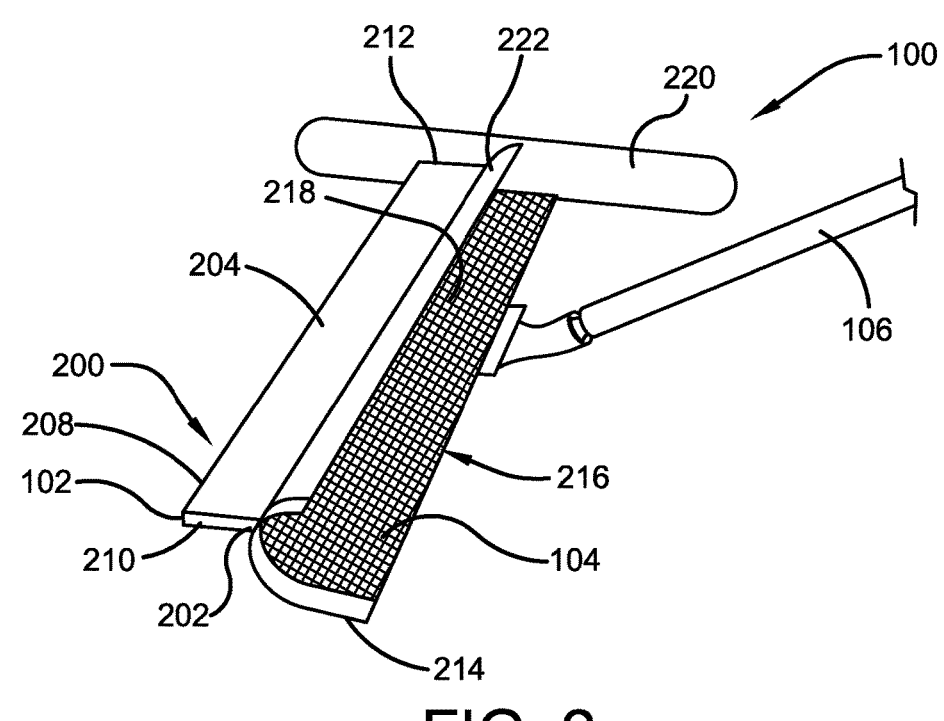
FIG. 2 illustrates a perspective view of one embodiment of the pool skimmer device of the present invention showing the wide skimmer head in accordance with the disclosed architecture.

As shown in FIG. 2, the pool skimmer device 100 comprises a base component 102 which is shown as generally having a frame 200 which is generally rectangular in shape and a net component 104 which is attached to the frame 200 and is in the nature of an open weave netting or mesh similar to that used in more conventional pool skimmers. Thus, it will be understood by those skilled in the art that the net component 104 is a porous material which allows water 112 to move easily therethrough and is configured to prevent the passage of most debris 110.

Furthermore, the frame 200 comprises a lower frame member 202 and an upper frame member 204 and front 206 and back 208, as well as right 210 and left 212 opposing side walls. The frame 200 is generally rectangular in shape, but can be any suitable shape as is known in the art. Further, the frame 200 is generally two to three feet long (i.e., the same length as the net component's width), but can be any suitable shape and size as is known in the art. The frame 200 components may comprise aluminum or plastic tubing or rods, etc., which may be formed of an injection-molded or vacuum-formed plastic, or any other suitable materials as is known in the art.

Additionally, the edges 214 of the net component 104 are integrally bonded to the frame members 202 and 204 through a molding or other thermally activated process. Typically, the net component 104 is secured to the base component 102 to form a U-shaped component but can be secured via any suitable shape and position as is known in the art. In one embodiment, the net component 104 forms a receiving U-shaped receptacle 218, with an open end 216 secured to the upper 204 and lower 202 frame members, thus forming a constant, rigid passageway into said net component 104. Generally, the net component 104 measures two to three feet wide but can be any suitable size as is known the art. Further, the net component 104 is typically comprised of a fine, stainless-steel mesh that measures between one to five microns. However, an open-weave netting, nylon screen, or a micromesh bag can also be used, or any other suitable porous material which allows water 112 to move easily therethrough and is configured to prevent the passage of most debris 110.

Further, a set of long floating pontoons 220 are secured at respective ends 222 of the frame 200, one at each end 222. The floating pontoons 220 can be any suitable shape and size as is known in the art. Typically, the floating pontoons 220 are shaped as cylinders and secured as the net component 104 is, via molding or other thermally activated process as is known in the art. The floating pontoons 220 are typically lightweight foams, such as polystyrene foam or the like. It is important that the floating pontoons 220 have sufficient buoyancy to prevent the base component 102 from sinking too far below the water level. Typically, the floating pontoons 220 are sized and shaped to allow the device 100 to be positioned halfway above the water level. Generally, the device 100 need only be of sufficient buoyancy to float on the surface of the water 112 in the pool 108. In this manner, water 112 with its entrained debris 110 flows by virtue of the circulation currents in the pool 108 in the direction of the device 100, wherein the debris 110 is collected by the net component 104.

As shown in FIGS. 3A-B, a flexible handle 106 is then secured to the base component 102. The handle 106 is telescopic and has the ability to connect to the base component 102. The handle 106 utilizes metal supports or segments 300 that range from the base component 102 to the handle 106 of the device 100 to telescope the handle 106. Specifically, the handle 106 comprises at least one telescoping segment 300 that allows the total length of the handle 106 to be extended or retracted. Each telescoping segment 300 is hollow and has a slip lock 302 for locking the segment 300 at a specific length. Further, the slip lock 302 is released by means of pressing or turning the slip lock 302. The at least one telescoping segment 300 allows the handle 106 to have a length from approximately three feet to six feet fully extended, allowing a user to set the pool skimmer device 100 at a desired height. Thus, the device 100 is approximately three feet in length but can be adjusted to a length of approximately six feet, if needed. Any type of telescoping lock, such as a clutch lock, cam lock, spring button, snap lock, set knob or any other suitable lock as is known in the art, can be used for securing a desired length of the telescoping segments 300 and for securing the telescoping segments 300 to each other, during extension and retraction of the telescoping segments 300 of the handle 106. Furthermore, a slip lock 302 is typically also used to secure the handle end 106 to the base component 102, similar to a push broom. However, any other suitable securing means can be utilized as is known in the art.

Furthermore, the handle 106 can also swivel. Thus, the handle 106 is secured to the base component 102 via a ball and socket hinge, swivel hinge 304, etc., or any other suitable swiveling means as is known in the art. Once secured via the swivel hinge 304, the handle 106 is then able to be moved in any direction and rotated in a 360-degree manner, as needed.

Generally, the handle 106 comprises a first end 306 secured to the base component 102 and a second end 308 configured to be held by a user 500. The second end 308 further comprises an ergonomic hand area 310 that comprises texture or gripping sections 312 to allow the user 500 to securely retain the handle 106 in their hands 314, even when it is wet.

As shown in FIG. 4, the pool skimmer device 100 is an H-shaped floating arrangement with a net component 104 secured to the base component 102 and having one of the pair of floating pontoons 220 secured to either side 222 of the base component 102. By providing a pair of floating pontoons 220, one at each end 222 of the base component 102, the device 100 is rendered more symmetrical and this construction may simplify manufacture.

In use, the user 500, holding the second end 308 of the handle 106 while standing on the deck 400 surrounding the pool 108, controls the movement of the base component 102 while drawing the same through the water 112, and without affecting the depth of the opening 216 of the net component 104. The respective ends 402 of the floating pontoons 220 are tapered upwardly to provide easy movement of the device 100 in the water 112 and to allow the base component 102 to slip easily over the objects encountered in the water 112, such as vacuum hoses, and the like, without interfering with the skimming operation. Further, the frame members 202, 204 maintain the frame 200 in alignment with the floating pontoons 220 to maintain the device 100 at the predetermined depth in the water 112.

Further, the pool skimmer device 100 is drawn through the water 112 with the open end 216 of the U-shaped net component 104 partially submerged so that leaves, grass, and other debris 110 may pass through said opening 216 and into the net component 106. Further, the skimmer device 100 readily and easily moves through the water 112 so that it will be possible for a user 500, including women and children, to skim the pool 108 with ease. Additionally, the large net area allows a user 500 to draw the pool skimmer device 100 over the entire area of the pool 108 surface from the deck 400 of the pool 108, efficiently and quickly.

Figure 5A:
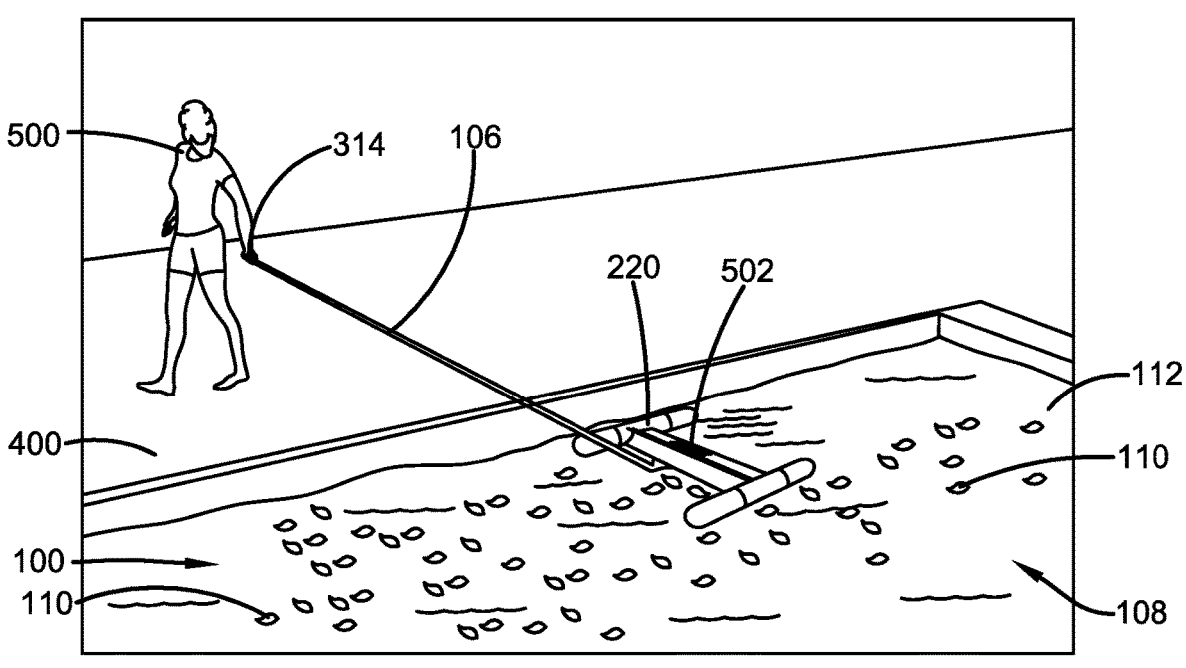
FIGS. 5A-B illustrate a perspective view of one embodiment of the pool skimmer device of the present invention showing the skimmer device pulled along the pool surface and being stored in accordance with the disclosed architecture.
Figure 5B:
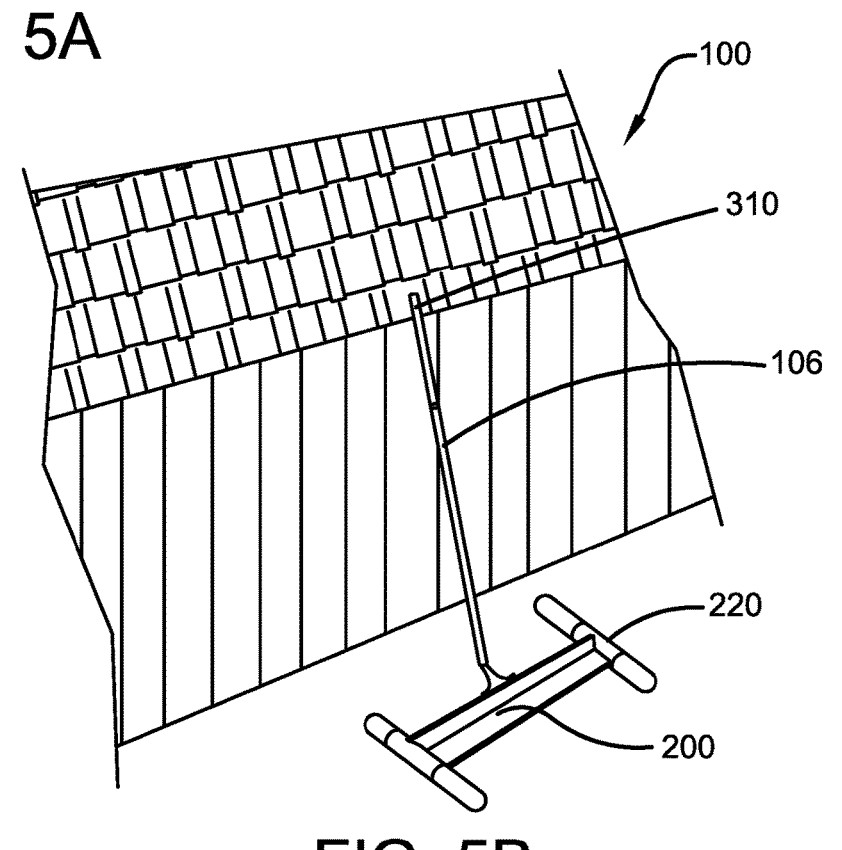

As shown in FIGS. 5A-B, the above description relates mostly to the use of the pool skimmer device 100 in swimming pools 108. However, the design of this device 100 will allow it to be used in many different bodies of water for many different duties. These include, but are not limited to, fishponds to remove surface debris; water fountains; oceans to rid the ocean of unwanted contaminants, such as oil or small floating plastics; and/or industries to clean retaining ponds. However, in all of these cases, the size of the device 100 may vary. For example, in a fishpond, the device 100 may only comprise a net component 104 of two feet in width. In the ocean, the device 100 may comprise a net component 104 of three feet in width. The size of the device 100 is determined by the task that it is to perform and the medium in which it is placed.

In one embodiment, the pool skimmer device 100 comprises a plurality of indicia 502. The base component 102 of the device 100 may include advertising, trademark, other letters, designs, or characters, printed, painted, stamped, or integrated into the base component 102, or any other indicia 502 as is known in the art. Specifically, any suitable indicia 502 as is known in the art can be included, such as, but not limited to, patterns, logos, emblems, images, symbols, designs, letters, words, characters, animals, advertisements, brands, etc., that may or may not be pool, water, or brand related.

Figure 6:
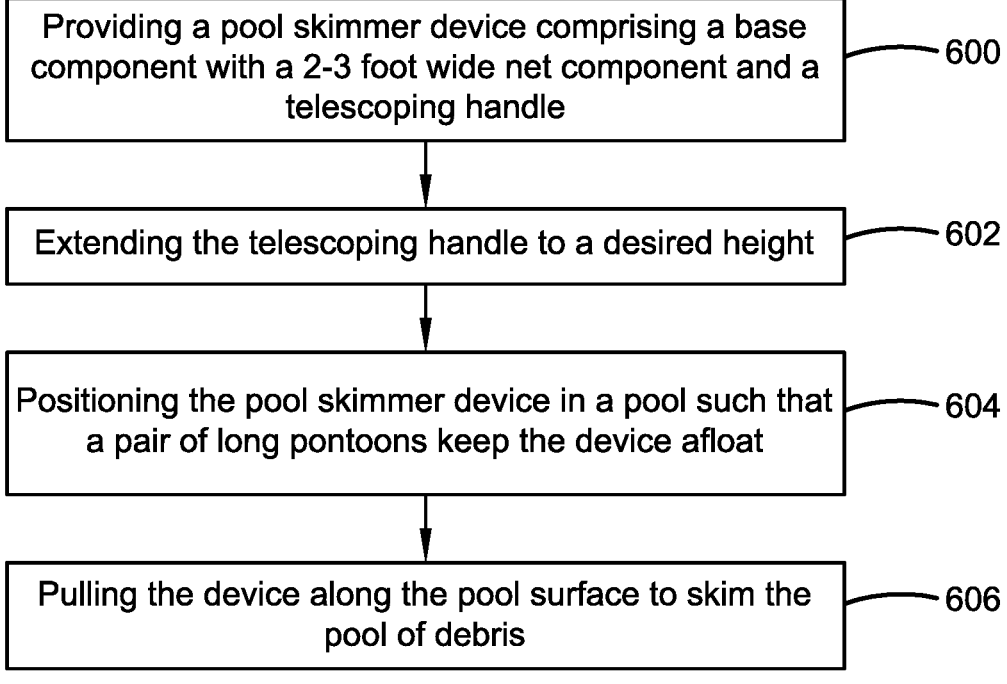
FIG. 6 illustrates a flowchart showing the method of skimming a pool's surface easily and efficiently in accordance with the disclosed architecture.

FIG. 6 illustrates a flowchart of the method of skimming a pool's surface easily and efficiently. The method includes the steps of at 600, providing a pool skimmer device comprising a base component with a two to three feet wide net component and a telescopic handle. The method also comprises at 602, extending the telescopic handle to a desired height. Further, the method comprises at 604, positioning the pool skimmer device in a pool, such that a pair of long pontoons keep the device afloat. Finally, the method comprises at 606, pulling the device along the pool surface to skim the pool of debris.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "pool skimmer device", "skimmer device", and "device" are interchangeable and refer to the pool skimmer device 100 of the present invention.

Notwithstanding the foregoing, the pool skimmer device 100 of the present invention can be of any suitable size and configuration as is known in the art without affecting the overall concept of the invention, provided that it accomplishes the above-stated objectives. One of ordinary skill in the art will appreciate that the pool skimmer device 100 as shown in FIGS. 1-6 are for illustrative purposes only, and that many other sizes and shapes of the pool skimmer device 100 are well within the scope of the present disclosure. Although the dimensions of the pool skimmer device 100 are important design parameters for user convenience, the pool skimmer device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pool skimmer device that allows a user to skim a pool with ease, the pool skimmer device comprising:
    a base component, wherein the base component comprises a frame which is generally rectangular in shape;
    a net component, wherein the net component is attached to the frame; and
    a handle;
    wherein the net component is approximately two to three feet wide;
    wherein the base component is placed inside of a swimming pool and the net component allows a user to capture unwanted debris from within the swimming pool;
    wherein the unwanted debris comprises pollen, insects, seeds, and leaves;
    wherein the frame comprises a lower frame member and an upper frame member and front and back, as well as right and left opposing side walls;
    wherein the frame is approximately two to three feet long;
    wherein edges of the net component are integrally bonded to the lower and upper frame members through a thermally activated process;
    wherein the net component is secured to the base component to form a U-shaped receptacle, with an open end, thus forming a constant, rigid passageway into the net component; and
    further wherein the net component is comprised of a fine, stainless-steel mesh that measures between 1-5 microns.

2. The pool skimmer device of claim 1, wherein the base component comprises a set of long floating pontoons, secured at respective ends of the frame, one at each respective end.

3. The pool skimmer device of claim 2, wherein the set of long floating pontoons are shaped as cylinders and comprise a polystyrene foam to allow the pool skimmer device to float.

4. The pool skimmer device of claim 3, wherein the handle is telescopic and comprises at least one telescoping segment that allows a total length of the handle to be extended or retracted.

5. The pool skimmer device of claim 4, wherein each of the at least one telescoping segments are hollow and have a slip lock for locking the at least one telescoping segments at a specific length.

6. The pool skimmer device of claim 5, wherein the handle is secured to the base component via a swivel hinge that allows the handle to swivel.

7. The pool skimmer device of claim 6, wherein the handle comprises a first end secured to the base component and a second end configured to be held by a user, and wherein the second end comprises an ergonomic hand area with textured sections.

8. A pool skimmer device that allows a user to skim a pool with ease, the pool skimmer device comprising:
    a base component comprising a rectangular frame with a lower frame member and an upper frame member and front and back, as well as, right and left opposing side walls;

a net component that is approximately two to three feet wide; and a handle;

wherein the rectangular frame is approximately two to three feet long;

wherein edges of the net component are integrally bonded to the lower and upper frame members through a thermally activated process;

wherein the net component is secured to the base component to form a U-shaped receptacle, with an open end, thus forming a constant, rigid passageway into the net component;

wherein the net component is comprised of a fine, stainless-steel mesh that measures between 1-5 microns;

wherein the base component comprises a set of cylindrical floating pontoons, secured at respective ends of the rectangular frame, one at each respective end;

wherein the set of cylindrical floating pontoons comprise a polystyrene foam to allow the pool skimmer device to float; and further wherein the base component is placed inside of a swimming pool and the net component allows a user to capture unwanted debris from within the swimming pool.

9. The pool skimmer device of claim 8, wherein the handle is telescopic and comprises at least one telescoping segment that allows a total length of the handle to be extended or retracted.

10. The pool skimmer device of claim 9, wherein each of the at least one telescoping segments are hollow and have a slip lock for locking the at least one telescoping segments at a specific length.

11. The pool skimmer device of claim 8, wherein the handle is secured to the base component via a swivel hinge that allows the handle to swivel.

12. The pool skimmer device of claim 8 further comprising a plurality of indicia.

\* \* \* \* \*